UNITED STATES PATENT OFFICE.

FRANÇOIS CHARLES ZAPFLE, OF NEW YORK, N. Y.

IMPROVEMENT IN FIRE-EXTINGUISHERS.

Specification forming part of Letters Patent No. 199,950, dated February 5, 1878; application filed November 23, 1877.

*To all whom it may concern:*

Be it known that I, FRANÇOIS CHARLES ZAPFLE, of the city of New York and State of New York, have invented a new and useful Compound for Preventing and Extinguishing Fire, which is fully described in the following specification.

It consists of a composition formed by mixing the following ingredients: Muriatic acid purified by the chloride of barium, carbonate of lime, crystallized alum with potassa base, chlorate of ammonia, borax, and water.

To prepare one hundred gallons of the super-compound, pour into a large vat or other receptacle of stone or pottery ware seventy gallons of muriatic acid purified by the chloride of barium at 19° Baumé. Neutralize the acid by adding thirty-four or thirty-six pounds of quicklime or carbonate of lime. Allow this to settle, and when cold draw it off clear. Into this neutralized acid pour about five gallons of water in which there has been previously dissolved three pounds of crystallized alum with potassa base, and also twenty gallons of water in which there has been dissolved ten pounds of the chloride of ammonium and ten pounds of borax. The phosphate of ammonia or sulphate of ammonia may be substituted for the borax.

The mixture of the alum-water with the solution of ammonia and borax should be made gradually, and the liquid stirred so as to prevent a deposit. Allow the compound to rest for forty-eight hours. It is then ready to be decanted and put into packages for use.

When properly made the compound has a density of 30° Baumé, and when analyzed gives sixty per cent. of chloride of calcium, and sixteen per cent. of chloride of ammonium.

When this compound is thrown upon a burning mass hydrochloric-acid gas combined with ammonia gas is freed, which smothers the flames, and all those parts that come in contact with the liquid are rendered incombustible. The fire is extinguished and reignition prevented.

Linen and cloth fabrics and all tissues of that nature, when well saturated with the compound, become incombustible.

This compound can be preserved for any length of time in liquid state without losing its properties. It is as limpid as pure water, will not soil or corrode the apparatus in which it is used, nor injure the tissues of any fabric that becomes saturated with it. It is in all respects perfectly harmless and perfectly safe for transportation.

To apply this compound to extinguish fires, all that is necessary is to pour it into the fire-engine or other extinguishing apparatus employed, in the proportion of twelve per cent. of compound to one hundred gallons of water, and use it through a hose in the same manner as water.

On the 18th day of February, 1874, at the city of Paris, France, there was issued to me Letters Patent, No. 102,282, for a fire-extinguishing compound, and on the 19th day of September, 1876, Letters Patent No. 182,508 were issued to me by the United States Patent Office for the same compound.

The superiority of the super-compound over this last composition consists in its greatly-increased effectiveness, and in the fact of its being applicable to other purposes. It will extinguish in one-third the time the most intense and violent of fires, and possesses the additional property of rendering incombustible tissues impregnated with it.

What I claim is—

The herein-described fire extinguishing and preventive compound, consisting of a mixture of calcium chloride, alum having a potash base, chloride of ammonium, borax, and water, substantially as herein set forth.

New York, November 20, 1877.

FRANÇOIS CHARLES ZAPFLE.

Witnesses:
J. E. CROULY,
A. H. ALKER.